June 17, 1924.
G. W. EDGECUMBE ET AL
SPOTLIGHT BRACKET
Filed Feb. 1, 1922
1,497,896
2 Sheets—Sheet 1
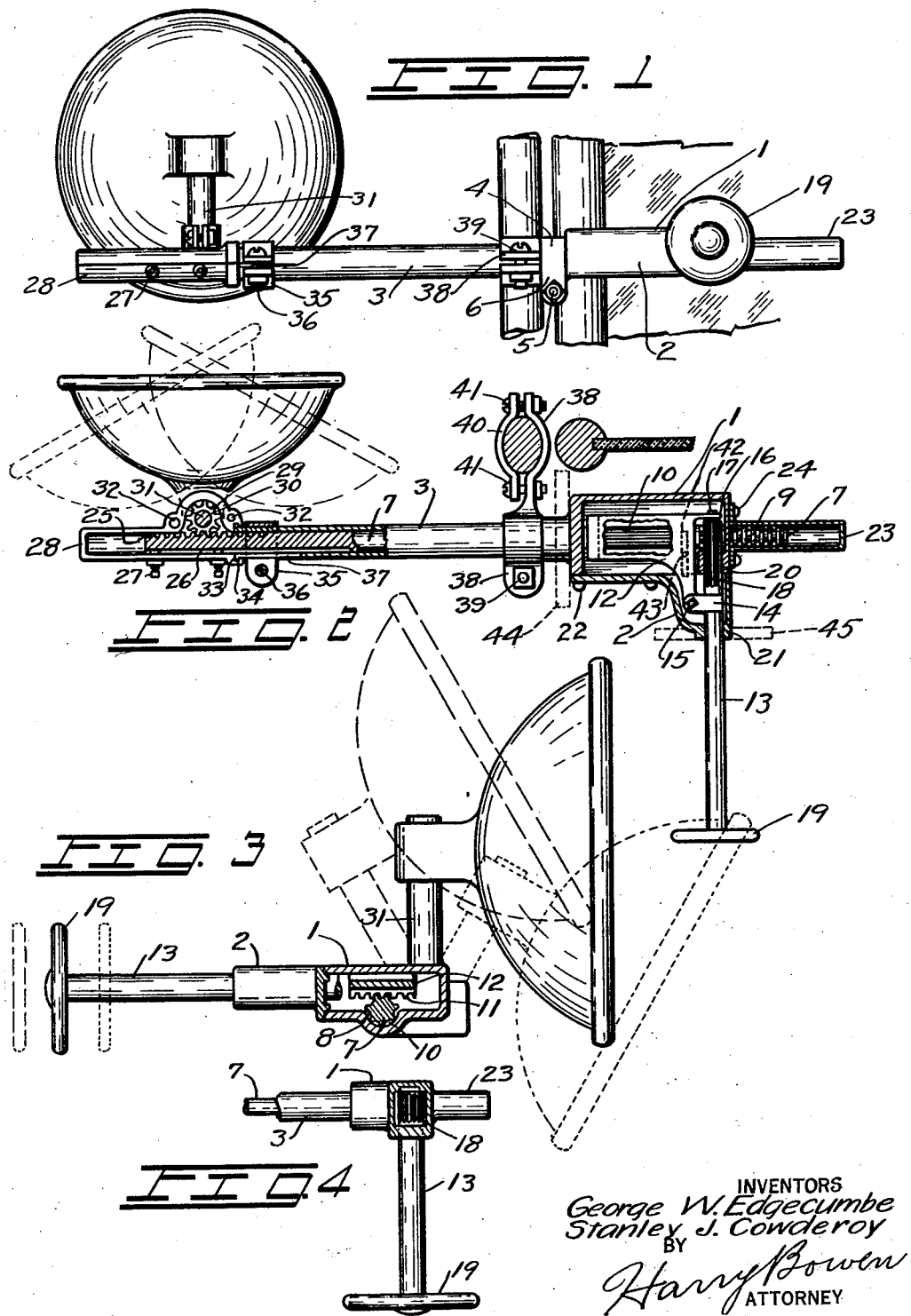
INVENTORS
George W. Edgecumbe
Stanley J. Cowderoy
BY
Harry Bowen
ATTORNEY

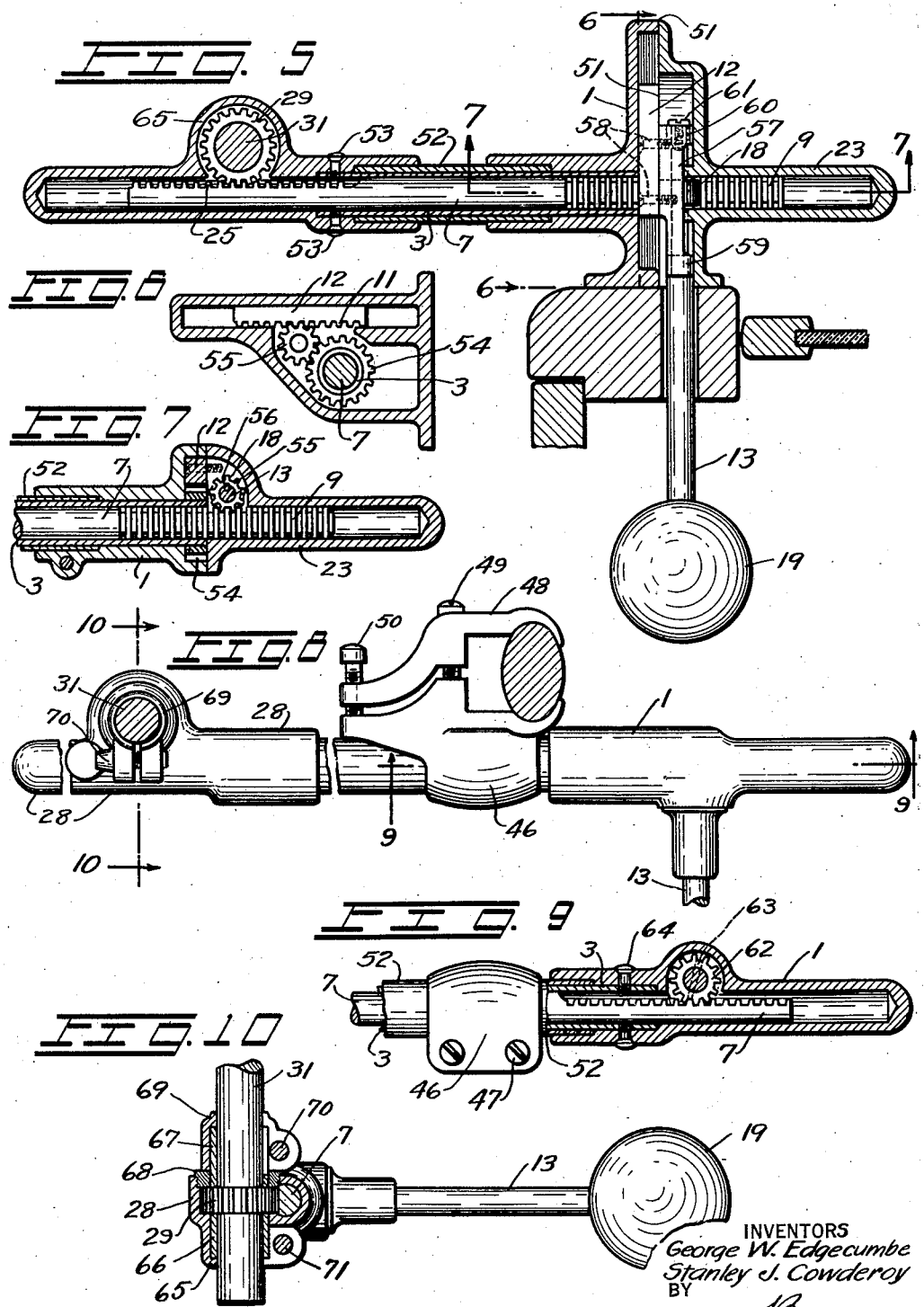

Patented June 17, 1924.

1,497,896

UNITED STATES PATENT OFFICE.

GEORGE W. EDGECUMBE AND STANLEY J. COWDEROY, OF SEATTLE, WASHINGTON; SAID COWDEROY ASSIGNOR TO IRVING LIONEL BAIN, OF VANCOUVER, BRITISH COLUMBIA, CANADA.

SPOTLIGHT BRACKET.

Application filed February 1, 1922. Serial No. 533,374.

*To all whom it may concern:*

Be it known that we, GEORGE W. EDGECUMBE and STANLEY J. COWDEROY, subjects of Great Britain, residing at Seattle, county of King, and State of Washington, have invented new and useful Improvements in Spotlight Brackets; and we do hereby declare that the following is a full, clear, and exact specification, such as will enable others skilled in the art to which they appertain to make and use the same.

The invention is a device for attaching a spotlight inside of an automobile windshield by which the spotlight may be turned upward or downward or from one side to the other from a handle inside of the car.

The object of the invention is to provide a spotlight bracket which may be attached to any windshield or enclosed car which will permit the spotlight to be turned in any direction from the inside of the car.

Another object of the invention is to provide a spotlight bracket with double acting gears in it by which the spotlight may be moved up or down or from one side to the other from a common handle.

And a still further object of the invention is to provide a combination of gears which when a handle is turned will move a shaft horizontally and when the handle is pushed inward or pulled outward it will cause the same shaft to rotate.

With these ends in view the invention embodies a casing supported by a suitable bracket on the side of a windshield with a sleeve extending outward in which is a rod with teeth on one side of its outer end a keyway also in its outer end and grooves and rings around its inner end. Another rod is mounted in the casing above and at right angles to the former rod which has grooves on its inner end to match the rings on the end of the former rod and a gear segment attached to it with teeth on its lower side to work in the grooves of the former rod. Another gear is mounted in the casing which is keyed to the outer end of the former shaft in such a manner that it will be rotated by the teeth in the shaft as the shaft moves inward and outward and the spotlight is fixedly mounted in this gear.

Other features and advantages of the invention will appear from the following description taken in connection with the drawings, wherein:—

Figure 1 is a side elevation.

Figure 2 is a plan view with part broken away.

Figure 3 is an end elevation with part broken away.

Figure 4 is a plan view with part broken away showing an alternate arrangement.

Figure 5 is a cross section similar to that shown in Figure 2 showing an alternate arrangement.

Figure 6 is a cross section on line 6—6 of Figure 5.

Figure 7 is a cross section on line 7—7 of Figure 5.

Figure 8 is a plan view similar to that shown in Figure 4 with the outer end complete.

Figure 9 is a cross section on line 9—9 of Figure 8.

Figure 10 is a cross section on line 10—10 of Figure 8.

In the drawings we have shown our device assembled in a casing 1 which has a cap 2 on one side and a sleeve 3 projecting from one end which is held in a boss 4 by a bolt 5. The lower side of the boss 4 is split and has two flanges 6 projecting downward which are bound together by the bolt 5. The sleeve 3 is placed in the hole of the hub 4 and as the bolt 5 is tightened it will clamp the sleeve in place.

A rod 7 is slidably mounted inside of the sleeve 3 and also in the semi-circular hole 8 in the lower side of the casing 1 and on the inner end of this rod are rings 9 which extend completely around the rod as shown in Figure 2. Next to these rings is a section with long grooves 10 extending completely around the rod as shown in Figure 3 and these grooves mesh with teeth 11 on the lower edge of the segment 12. This segment is attached to a rod 13 by a flange 14 and a screw 15 and also by a small projection 16 with a small hole in it thru which a small end 17 of the rod 13 projects. On the inner end of the rod 13 are longitudinal grooves 18 and on the outer end is a handle or hand wheel 19. It will be seen that as the handle is turned the grooves 18 operating in the rings 9 of the rod 7 will cause the rod 7 to move laterally while at the same time the rod 13 may be pushed inward or pulled outward which would cause the teeth 11 to move backward or forward and these teeth operating in the grooves 10 would cause the rod 7 to rotate. The casing 1 may be constructed as shown with the recess 8 in its lower side which forms a bearing for the rod 7 and a bearing 20 in it for supporting the shaft 13 which is also supported in another bearing 21 in the cap 2. The cap 2 is held to the casing 1 by screws 22 and another cap 23 is held to the end of the casing 1 by screws 24 which forms a covering for the end of the rod 7.

The rod 7 extends outward any desired length and has teeth 25 in one side of its outer end and a slot 26 also in its outer end which thru the set screws 27 causes the casing 28 to rotate with the shaft. A spur gear 29 is mounted in bearings in the casing in such a manner that its teeth will engage the teeth 25 in the rod 7. And it has a hole 30 in its center thru which a stem 31 of a spotlight may be held by splitting a sleeve on the upper side of the gear and placing a clamp around it. The casing 28 may be made in two halves and these may be bolted together by the bolts 32 or it may be made in one piece with a cap on its upper side. A groove 33 is made around its inner edge which works freely over a flange 34 on the end of the sleeve 3 and prevents the casing 28 from moving off of the end of the rod. A clamp 35 may be placed around the sleeve 3 which may have a bolt 36 thru it so that as the bolt is tightened it will cause the end of the sleeve which may have a slit 37 in one side to frictionally grip the rod 7 in order to prevent it from turning too freely. It will be seen that this friction may be regulated by tightening or loosening the bolt 36.

A clamp 38 may be placed around the sleeve 3 in order to support the device on the side of the windshield and may be held to it by the bolt 39. The outer end of the clamp may be bent as shown in Figure 2 and may have a clip 40 bolted to it by the bolts 41 by which it may be held to the vertical member of the windshield, or this bracket may be made as shown in Figure 8 by clamping a sleeve 46, having bolts 47 in it, around the device and holding this to the side of the windshield by another clamp 48 which is held in place by screws 49 and 50. It will be understood that this bracket may be made in any desired manner to fit any desired windshield.

In Figure 5 we have shown an alternate arrangement wherein the casing 1 is split on the line 51 and the cap 23 is made a part of the casing. Another sleeve 52 has also been added which forms a covering for the sleeve 3 as this will permit the sleeve 3 to rotate with the outer casing to which it is held by the screws 53. We have also inserted a gear 54 on the inner end of the sleeve 3 and an intermediate gear 55 which meshes with the teeth 11 of the segment 12 and also with the teeth of the gear 54 so that as the segment is moved backward and forward the gears will twist the sleeve 52 and move the spotlight upward or downward. It will be seen that by this arrangement it is possible to obtain the same movement that is obtained by the design shown in Figure 2 without the use of the wide segment which necessitates a much more elaborate casing. We have also placed the grooves 18 on the end of the rod 13 on a separate piece of material 55 and keyed this to the rod by a key 56 as shown in Figure 7 as by this arrangement the rod 13 may slide in and out thru the member 55 while this member remains in a stationary position as shown in Figure 5. The segment 12 is attached to the rod 13 by a bracket 57 which is held to the segment by the screws 58 and to the rod over which hubs 59 and 60 on it pass by a screw 61.

In Figure 4 we have shown an alternate or simplified arrangement omitting the means for rotating the shaft 7 as in this arrangement the handle 19 may be raised or lowered to rotate the shaft while the same means is used to move the shaft inward or outward in order to move the light laterally.

In Figure 2 we have shown an additional means for limiting the movement of the segment 12 in the form of a slot 42 with a pin 43 in it and as the length of this slot may be any desired distance it will be possible to regulate the movement of the segment. We have also shown in dotted lines a flange 44 at one end of the casing 1 and another flange 45 on the cap of the casing by which the device may be bolted to the side or front of an enclosed car.

In Figure 9 we have shown another alternate arrangement of the design shown in Figure 4 wherein the grooves 18 on the rod 13 are supplanted by a small gear 62 which may be shrunk on the rod or held in place by a pin 63 and as the sleeve 52 is held in the clamp 46 and sleeve 3 which is held by screws 64 to the casing 1 and by screws 53 to the casing 28 is free to rotate in the tube 52 it will be possible to twist the spot light which would be held in the casing 28 by twisting the casing 1 with the handle 19. The casing 28 at the outer end of the bracket may be constructed as shown in Figure 10, wherein, a round boss 65 is made in its side in which the gear 29 with a sleeve 66 below it is placed. Another sleeve 67 is then placed above the gear and a nut 68 is screwed into the top of the boss to hold the gear in place. A split collar 69 may then be placed over the sleeve and as the bolt 70 is tightened the collar will grip the sleeve and rod 31 which may be placed thru them to hold the spotlight. The lower part of the boss 65 may also be split and a bolt 71 placed in it which may be tightened so that the boss will grip the sleeve 66.

It will be understood that other changes in the construction can be made without departing from the spirit of the invention. One of which changes may be in the use of more rings 9 than shown or in the extending of them for a greater distance along the rod. Another may be in the making of the grooves 18 longer than shown and another in the extending of the grooves 10 for a greater distance along the shaft. The teeth 25 may also extend for a greater distance along the shaft and the gear 29 may be of a larger or smaller diameter as may be required to move the spot light any desired distance. The segment 12 may also be made any desired shape and attached to the rod 13 in any desired manner.

And a still further change may be made in the outer end of the bracket by the use of a different type of sleeve with a different means for holding the casing 28 to it and a different method for keying this casing to the shaft.

The construction will be readily understood from the foregoing description. To use the device it may be mounted upon a windshield as shown in Figures 1 and 2 and when it is desired to move the spotlight laterally the handle 19 may be turned either in a clockwise or counter-clockwise direction by hand, which thru the grooves 18 and the rings 9 will cause the rod 7 to move horizontally and this will rotate the gear 29 and move the spot-light from one side to the other as shown in dotted and dash line in Figure 2. When it is desired to twist the light upward or downward the handle 19 may be moved inward or outward which will move the segment 12 and this thru the teeth 11 and the grooves 10 will cause the shaft 7 to rotate; and as the spotlight is keyed to the shaft it will rotate with it and move upward to the position shown in dash lines in Figure 3 or downward to the position shown in dotted lines in Figure 3. It is understood that any of the positions shown in dotted or dash lines are not extreme positions as it will be possible to move it much further with this device as it may be constructed so that the light may be moved to any desired distance. The design shown in Figure 4 may be mounted in the bracket 38 on the side of a windshield and the sleeve 3 rotatably mounted in the casing 1 so that as the handle 19 is raised upward or downward it will cause the casing and rod 7 to rotate.
It will be seen that in the construction shown in Figure 2 the spotlight may be raised or lowered or moved laterally at the same time as the handle 19 may be pushed inward or pulled outward at the same time it is being turned.

Having thus fully described the invention, what we claim as new and desire to secure by Letters Patent is:—

1. A spotlight bracket of the type described embodying a casing divided in two halves; a rod with a handle on its outer end projecting from the casing; a gear rack attached to the rod by a bracket; a small gear slidably mounted on the rod with a key thru it; a rod in the casing with rings around one end and a rack on the other at right angles to and below the rod so that the rings will mesh with the gear on the rod; a small gear rotatably mounted in the casing meshing with the rack; another gear meshing with this gear fixedly mounted on the end of a sleeve around the shaft; another sleeve on the outside of this sleeve in the end of the casing; another casing on the opposite end of the sleeve which is held by screws to the inner sleeve into which the rack end of the shaft projects; a small gear which meshes with the teeth of the rack; suitable sleeves and collars for holding a stem supporting a spotlight in the casing and suitable bolts for causing the sleeves to frictionally grip the spotlight stem.

2. A spotlight bracket of the type described embodying a casing; a rod with a small gear on its end rotatably mounted in the casing and projecting from it; a rod with a rack on each end slidably mounted in the casing at right angles to the rod so that the teeth of the rack will engage the teeth of the gear; a sleeve around the shaft projecting from the end of the casing and held to it by screws; a second sleeve around this sleeve also projecting from the end of the casing; a bracket attached to the latter sleeve for holding the device to the side of a windshield; a casing at the outer end of the sleeves into which both of the sleeves and rod project; screws for holding the inner sleeves to the casing; a gear in the casing which meshes with the rack at the outer end of the shaft and suitable collars and sleeves for clamping the stem of a spotlight to the gear and casing.

3. A spotlight bracket having a casing on its inner end, another casing at its outer end, a sleeve between the casings upon which the casings are slidably mounted, a clamp around the sleeve by which it may be attached to the frame of a motor vehicle windshield; said sleeve having a smaller sleeve slidably mounted therein, which projects beyond its end and into the casings, said smaller sleeve being fixedly held to the casing, a rod slidably mounted within the smaller sleeve, having racks on its ends which project into openings in the casings, a pinion in the casing at the inner end of the bracket, a rod upon which the pinion is mounted, which projects from the inner casing and has a knob on its outer end to form a handle; another pinion in the casing at the outer end which is provided with a clamp in which the post of a spotlight may be held; and a clamp on the inner casing for adjusting the friction between the casing and the outer sleeve.

GEORGE W. EDGECUMBE.
STANLEY J. COWDEROY.